Jan. 11, 1966 W. C. TOMERLIN, JR 3,228,259

LIMITED-ROTATION UNIDIRECTIONAL DRIVE

Filed Aug. 15, 1962 3 Sheets-Sheet 1

INVENTOR

William C. Tomerlin, Jr.

BY Adolph C. Hugin

ATTORNEY

Jan. 11, 1966 W. C. TOMERLIN, JR 3,228,259

LIMITED-ROTATION UNIDIRECTIONAL DRIVE

Filed Aug. 15, 1962 3 Sheets-Sheet 2

INVENTOR

William C. Tomerlin, Jr.

BY Adolph C. Hugin

ATTORNEY

INVENTOR
William C. Tomerlin, Jr.

BY Adolph C. Hugin
ATTORNEY

United States Patent Office 3,228,259

Patented Jan. 11, 1966

3,228,259
LIMITED-ROTATION UNIDIRECTIONAL DRIVE

William C. Tomerlin, Jr., Shreveport, La., assignor to United Gas Corporation, a corporation of Delaware Filed Aug. 15, 1962, Ser. No. 218,213
13 Claims. (Cl. 74—527)

This invention relates to limited-rotation unidirectional drives which are particularly useful in switches and switching commutators of a type useful in recording devices.

This application is a continuation-in-part of application Serial No. 206,285, filed June 29, 1962, which is a division of application Serial No. 165,717, filed January 4, 1962, which latter is a continuation-in-part of application Serial No. 857,452, filed December 4, 1959.

The increasing complexity of modern business and industry, particularly in the volume of units, readings, etc., that must be handled, has developed a need for a portable or semi-portable device relatively small in size and simple to operate which is capable of recording information for input computers. The device may be used for any purpose in which listing of numbers, preparation of tallies, lists or the like is required. For example, the device might be used in stores for taking inventory, in railroads for freight car checking, and the like.

An important aspect of these devices is the need for small, lightweight, and reliable components. It is especially required that such components assure a single entry or recordation for each item of information. A magnetic digital recorder of this type forms the subject of the two earliest filed above mentioned applications and includes an improved commutator with a drive which assures accurate connections for transmittal of recording signals to a recording head.

An object of this invention is to provide an improved limited-rotation unidirectional drive.

Another object of this invention is to provide an improvide latching single-rotation unidirectional drive.

A further object of this invention is to provide an improvide latching limited-rotation unidirectional stepping drive which requires a predetermined minimum advance for each step.

Yet another object of this invention is the provision of an improved stepping drive wherein a predetermined minimum advance is required of each step before another can be started.

A still further object of this invention is the provision of an improved unidirectional commutator drive.

Further objects and advantages of this invention will become apparent from the following description referring to the accompanying drawing, and the features of novelty which characterize this invention will be pointed out with particularity in the claims appended to and forming a part of this specification.

Figure 1:
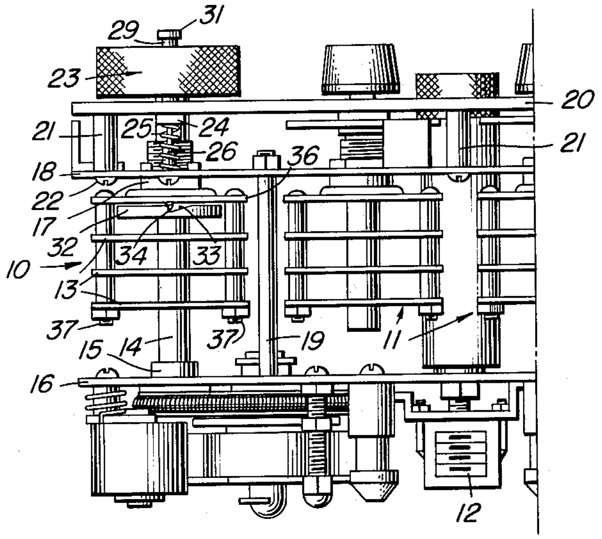
FIG. 1 is a side elevational view, partly broken away, illustrating an embodiment of the present improved drive in a commutator used in a magnetic digital recorder.
Figure 2:
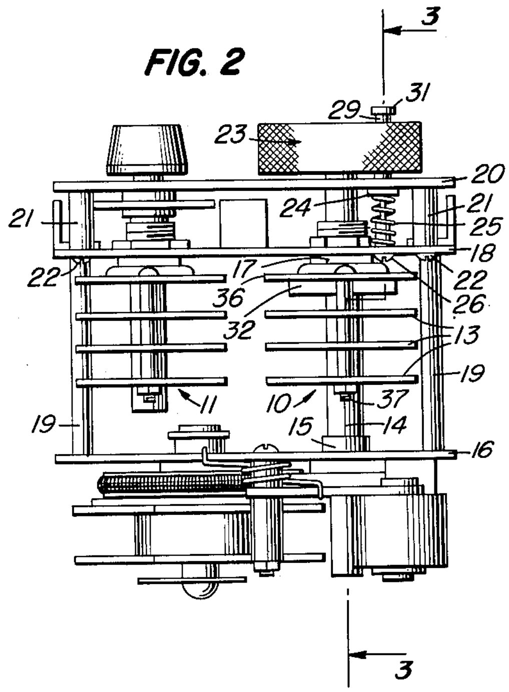
FIG. 2 is an end view of the structure shown in FIG. 1.
Figure 3:
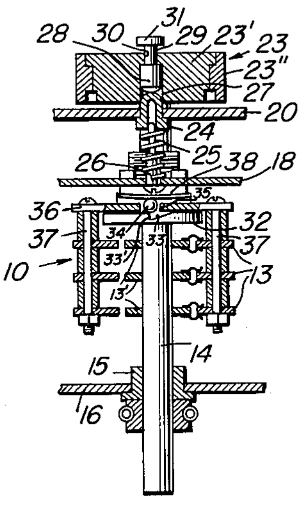
FIG. 3 is a sectional view taken along line 3—3 of FIG. 2 showing the commutator with the improved latching unidirectional stepping drive.

Referring to the drawings, FIGS. 1–3 illustrate an improved latching, limited-rotation, unidirectional drive embodying the present invention applied to a commutator 10 in a magnetic digital recorder. The illustrated structure assures a minimum advance of a complete step or rotation of the commutator before another advance can be begun so as to provide reading connections to all of a plurality of suitable digit switches 11, whereby all switch 11 entries are recorded by a suitable multiple channel magnetic recording head 12 before a subsequent entry cycle can be started. Details of the magnetic recorder are disclosed and claimed in the previously mentioned two earliest filed applications.

The read-in commutator 10 comprises three wafer switch units 13 of any suitable conventional type, with the rotatable parts 13' thereof fixedly mounted on a shaft 14. This shaft is rotatably supported by a bearing 15 on a base plate 16 through which the shaft extends and by a bearing 17 mounted on a second base plate 18. The two base plates are secured in spaced apart relation by suitable spacer posts 19 and are spaced from a closure plate 20 by suitable spacers 21 and secured in position thereon by screws 22.

The commutator 10 is adapted to be rotated by a unidirectional drive through a suitable knurled knob 23 positioned above the closure plate 20. The unidirectional rotation is provided by any suitable ratchet (not shown) in the knob 23 arranged between a driven rotatable core member 23' and an outer knurled driving sleeve member 23''. In order to provide a complete commutated entry into the recording head 12 by all of the digit switches 11, the commutator 10 must be rotated a predetermined step, which in this instance is a full turn, for each reading, and it should begin from a fixed "off" position. The knurled knob 23 functions as a driving member for operating the commutator, and the shaft 14 functions as part of the driven member which transmits the step drive to the various commutating and other driven components of the recorder.

In order to provide a point of beginning, "off" position, and a stop for the read-in commutator, a latch means is provided, details of which are best seen in FIG. 3. A detent 24 is carried in the closure plate 20 below the knurled knob 23. This detent is resiliently biased toward the knob by a suitable compression spring 25 mounted on a detent guide screw 26. The detent 24 projects into a complementary bore or socket 27 within the core 23' of knurled knob 23 so as releaseably to latch the knob against rotation. A detent release plunger 28 is slidably mounted axially movable in the knurled knob with the inner end thereof in engagement with the adjacent end of the detent 24. A necked-down portion 29 of the plunger extends through a passageway 30 in the knurled knob and is slightly longer than the passageway 30 so that the detent release plunger 28 may be depressed by pressing on a release button 31 on the outer end of the necked-down portion 29. The button 31 is larger than the passageway and thereby provides a convenient stop for limiting its depression by engagement with the adjacent top surface of the knurled knob 23. Depression of the plunger 28 moves the detent 24 out of the socket 27 and releases the latch means so as to permit rotation of the knurled knob 23 and the shaft 14, whereby the commutator 10 can be operated to connect the various digit switches 11 to the recording head 12 after the desired data has been placed in the recorder by the setting of the digit switches.

In order to prevent re-engagement of the latch means before the operator can actuate the knurled knob 23, a means is provided for automatically producing a relative angular displacement between the latching detent and the socket 27 in the knob core 23' by turning the commutator 10 by the shaft 14 a sufficient distance to prevent re-engagement of the latch means until the operating knurled knob 23 has been advanced the full turn comprising its operating step. For this purpose, the shaft 14 is provided with a disc 32, fixedly mounted thereon in any suitable manner, having a notch 33 therein, and a ball 34 positioned in a guide hole 35 in a stationary disc 36. This disc is secured to the commutator wafer switch units 13 by switch mounting bolts 37, and the guide hole 35 is positioned to overlie the notch 33 and position the ball 34 poised on the forward edge 33' of the notch 33 when the commutator is in its "off" position, FIGS. 1 and 3. A leaf spring 38 is arranged to urge the ball 34 into engagement with the disc 36. The construction is such that when the detent 24 is engaged in the socket 27, the ball 34 partially overlies the notch 33, with the center of the ball just past the leading edge 33' of the notch. Thus, when the detent 24 is released, the spring 38 acting downwardly on the ball 34 will force it down into the notch 33, resulting in a slight advance rotation of the commutator 10 to a position at which the detent 24 is no longer in register with the socket 27.

At such a time, the knurled knob 23 may be rotated so as to advance the commutator 10 through its predetermined single-turn step of 360 degrees, at which point the detent 24 will be moved into the socket 27 by spring 25, thereby latching the read-in commutator against further movement, while the one-way ratchet in the knob prevents reverse rotation of the driven shaft 14. In the illustrated recorder, the movement of the shaft 14 by turning of the knurled knob 23 also is used to operate various other components of the recorder. In this manner, a very simple, reliable, limited-rotation unidirectional drive structure is provided which assures a predetermined advance of a driven member for each step prior to actuation for a succeeding step, and also assures against reverse rotation of the driven member.

FIGS. 4–10 illustrate details of another embodiment of an improved latching, limited-rotation, unidirectional drive, similar to that illustrated in FIGS. 1–3, and particularly useful as the actuating member for a commutator in a magnetic digital recorder of the type illustrated in part in FIG. 1. In this embodiment, the improved drive and the wafer switches comprising the electrical contact members of the commutator are shown assembled as a self-contained unit which may be readily installed in any device in which it is to be utilized.

As in the previously described embodiment of the present invention, the construction illustrated in these figures assures a minimum advance of a complete step or rotation of the commutator before another advance can be begun, thereby providing for a reading of all of the connections made to the various contacts of the commutator and a consequent entry thereof in a suitable recorder before a subsequent reading cycle can be begun, without duplicating any of the entries. This embodiment of the present invention also can be used as an improved drive with other types of equipment which require unidirectional, limited-rotation, cyclic actuation.

In this embodiment, the improved drive is illustrated in connection with a three-wafer commutator switch, each wafer switch unit comprising any suitable conventional structure of this type. Such a wafer switch is illustrated in detail in FIGS. 4, 5, 6 and 9 and comprises a stationary insulating ring member 40 on which a plurality of angularly spaced staionary contacts 41 are mounted. Each of these contacts is provided with a stem 41' which is adapted to be connected to the circuitry being commutated by the respective wafer switch, and one of the stationary contacts 42 is slightly longer than the other contacts and is provided with a stem 42' adapted to be connected to a suitable source of electrical energization. The longer stationary contact 42 extends radially inwardly and functions as a brush having an electrical contact with a slip ring 43 mounted on a rotatable insulating wafer disc 44. The wafer discs 44 of the three switches are secured to a shaft 45 in any suitable manner, as by engagement with flat sides 45' of the shaft 45 and stakes 46 in the shaft 45 on both sides of the wafer discs 44, as is more clearly shown in FIG. 6.

The slip ring 43 of each switch may be secured to the wafer disc 44 in any suitable manner, as by a plurality of small rivets 47, and is formed with a single contactor 48 extending outwardly therefrom and adapted sequentially to make electrical contact with the stationary contacts 41 so as to energize each of these contacts individually and sequentially. Depending upon the type of circuit in which the commutator wafer switch is connected, the contactor 48 may be actuated so as normally to be in a position of reset in engagement with one of the stationary contacts 41 or normally to be out of contact with the stationary contacts 41. In the illustrated construction, the three wafer switches are mounted in spaced apart relationship by insulating sleeves 49 and are secured to a mounting disc 50 and spaced therefrom by insulating sleeves 51 and through bolts 52 which extend through the mounting disc 50, the sleeves 51, the insulating ring members 40, and the sleeves 49.

The shaft 45 on which the rotatable wafer discs 44 are mounted is rotatably supported in a bearing 53 which is secured to a base plate 54 in any suitable manner, as by a lock nut 55 which threadedly engages a threaded portion 53' of the bearing 53 and clamps the base plate 54 between the lock nut 55 and a shoulder on the bearing 53. The mounting disc 50 also is rigidly secured to the bearing 53 in any suitable manner, as by a tight press fit. The shaft 45 is longitudinally located in the bearing 53 by a lock ring 56 mounted in a groove around the shaft 45 and arranged in engagement with the outer edge of the threaded portion 53' of the bearing and by a spring pressure on a rotation-limiting disc 57. This rotation-limiting disc 57 is fixedly mounted on the shaft 45 in any suitable manner, as by a tight press fit in engagement with the flat sides 45' and the arcuate connecting surfaces of the shaft. This assures a fixed relationship between the disc 57 and each of the water switch discs 44, so that a definite positioning of the disc 57 determines the position of the wafer switch discs 44 and, therefore, of the rotatable contactors 48.

Figures 4, 5, 6, 7, 8, 9, 10, 11:
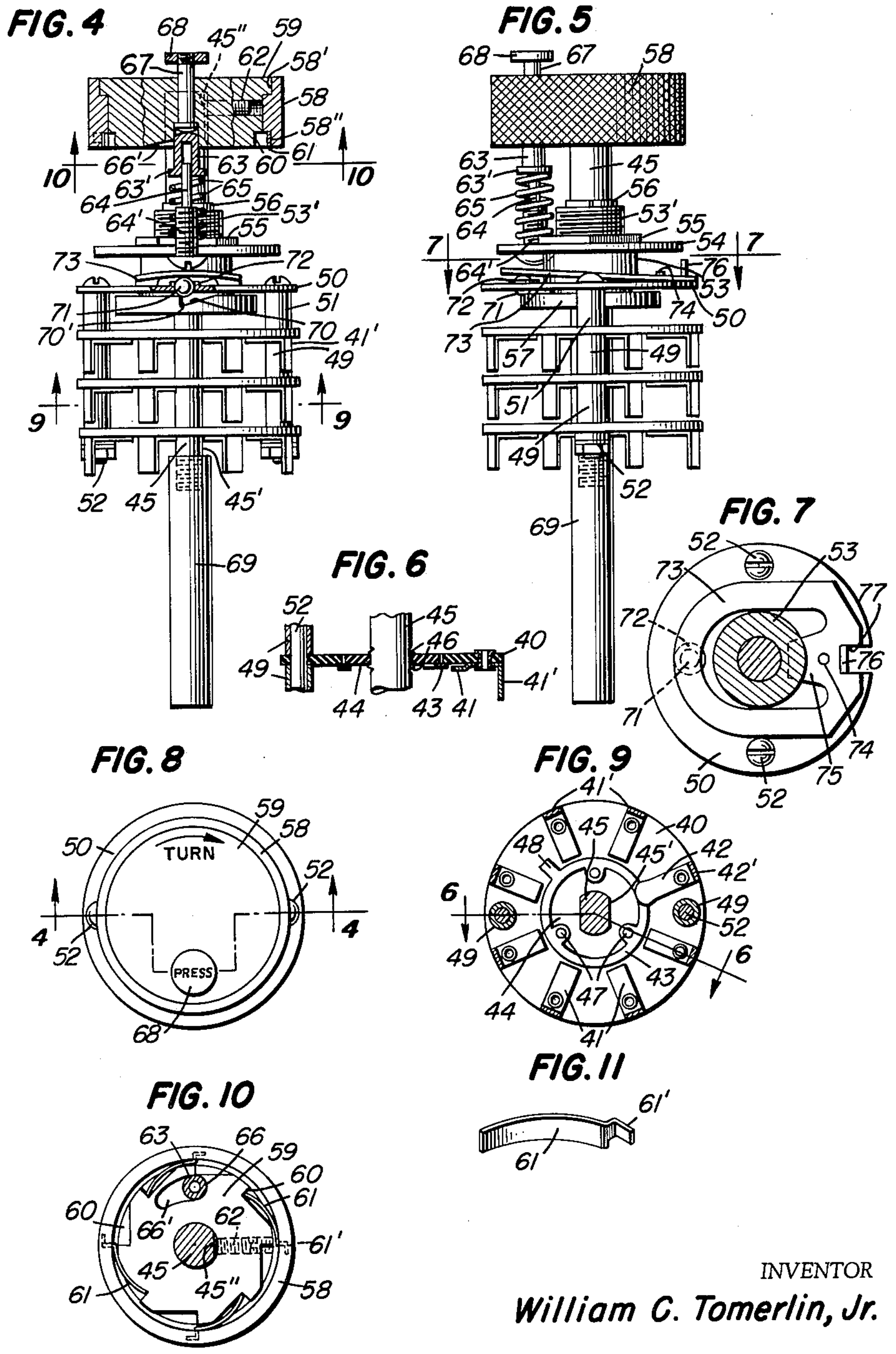
FIG. 4 is a side elevational view, partly broken away along line 4—4 of FIG. 8, illustrating another embodiment of the present improved drive, similar to that of FIGS. 1–3, and applied to a commutator for a magnetic digital recorder or similar device.
FIG. 5 is a side elevational view, taken at right angles to FIG. 4, of the commutator and drive embodiment shown in FIG. 4.
FIG. 6 is a fragmentary sectional view, taken along line 6—6 of FIG. 9, illustrating the relative arrangement of the insulating and conductor parts of a wafer switch member and the mounting thereof forming a portion of the commutator illustrated in FIGS. 4 and 5.
FIG. 7 is a sectional view, taken along line 7—7 of FIG. 5, illustrating details of the stepping leaf spring structure.
FIG. 8 is a top plan view of the commutator shown in FIGS. 4 and 5.
FIG. 9 is a sectional view, taken along line 9—9 of FIG. 4, illustrating the general structure of a wafer switch of the type usable in a commutator such as that illustrated in FIGS. 4 and 5.
FIG. 10 is a sectional view, taken along line 10—10 of FIG. 4.
FIG. 11 is a perspective view showing details of a spring pawl of the type illustrated in FIGS. 4 and 10.

The commutator wafer switch disc contactors 48 are adapted to be rotated only in one direction in order to assure a proper connection of the circuits connected to the various stationary switch contacts 41 to provide the desired operation of the magnetic recorder of similar device in which the commutator is used. This unidirectional rotation of the commutator is provided by a suitable one-way drive pawl and ratchet mechanism which is adapted to be actuated by a knob having a knurled driving sleeve member 58 mounted around a knob driven core member 59. A positioning groove 58' is formed around the inner upper edge of the sleeve 58 and is arranged in engagement with a complementary flange on the upper edge of the knob core 59. The lower cylindrical surface of the knob core is formed with a plurality of notches 60, FIGS. 4 and 10, and a plurality of pawls 61 in the form of leaf springs are formed with tongues 61' mounted in a groove 58" around the lower inner edge of the sleeve 58. These pawl leaf springs 61 extend from the sleeve groove 58" inwardly into engagement with the adjacent surface of the knob core 59 and normally extend into the core notches 60 into driving engagement with the clutching end surfaces of the notches 60, as shown in FIG. 10. The knob core 59 is shown as formed with twice as many notches 60 as the number of pawl leaf springs 61 mounted in the sleeve 58 but this is not essential to a proper functioning of the present structure. As shown in FIG. 4, the core 59 is mounted on shaft 45 and is rigidly secured thereto in any suitable manner, as by a set screw 62 extending through the core 59 and into engagement with a flat 45" on the end of the shaft 45. This knob construction provides a one-way clutch drive through the ratchet teeth formed in the core 59 by the notches 60 and the pawl leaf springs 61 secured to the sleeve 58.

As can readily be seen from FIG. 10, rotation of the knob sleeve 58 in a counterclockwise direction, as viewed in this figure, will provide a driving engagement between the sleeve 58 and the core 59 through the pawl springs 61 and the ratchet teeth formed by the notches 60. Likewise, rotation of the sleeve 58 in a clockwise direction, as viewed in FIG. 10, will merely cause the pawl springs 61 to ride over the ratchet teeth formed by the notches 60 in the core 59 and no drive will be provided between the sleeve 58 and the core 59. Thus, the knob comprising the knurled sleeve 58 and the core 59, with the one-way clutch drive therebetween, functions as a driving member for operating the shaft 45, and consequently the various elements connected thereto, as a unidirectional driving member. In structures such as the illustrated commutator, it is also necessary that the drive of the commutator provide for a definite step advance to the various commutating and other driven components of the recorder.

In order to provide a starting point or OFF position and a stop for the commutator, a latching mechanism is provided, details of which are best seen in FIGS. 4, 5, 7, and 10. This mechanism includes a latching detent 63 having a socket extending longitudinally therein slidably mounted on a guide pin 64 formed as the end of a mounting screw 64' extending through and secured to the base plate 54. The detent 63 is resiliently biased toward the knob by a suitable compression spring 65 held between the base plate 54 and a spring seat shoulder 63' on the detent 63.

The knob is adapted to be latched by the detent 63 at the end of each predetermined advance step. This is provided by forming a socket 66 in the underside of the knob core 59 into which the detent 63 is adapted to be biased by the spring 65 when the knob core 59 is turned to a position so that the socket 66 is directly over the detent 63. In order to facilitate smooth entry of the detent into the socket 66, a tapered lead-in groove 66' preferably is formed in the leading edge side of the socket 66. A detent release plunger 67 is slidably mounted axially movable in the knob with the inner end thereof in the socket 66 and the upper end thereof formed with a suitable operating button 68 thereon. The detent release plunger 67 is slightly longer than the axial length of the knob core 59 such that when the detent 63 is in engagement with the socket 66, depression of the plunger 67 by pressing on the button 68 will cause the detent 63 to be pressed axially below the lower surface of the knob core 59, so that the knob core can be turned relative to the detent 63. As is more clearly shown in FIG. 4, the plunger 67 is formed with an enlarged head on the inner end thereof which is adapted to engage the detent 63 and also forms a stop which limits the outer extent to which the plunger 67 can be moved by the detent 63. The button 68 is larger than the passageway through which the plunger 67 extends in the core 59 and thereby provides a convenient stop for limiting the depression of the release plunger by engagement of the button 68 with the adjacent top surface of the knob core 59. Thus, a convenient mechanism is provided for locking the knob in relation to the base plate 54 by engagement of the detent 63 with the knob socket 66, and depression of the plunger 67 moves the detent 63 out of the socket 66 and releases the latching mechanism so as to permit rotation of the knob and therefore the shaft 45 secured thereto whereby the commutator wafer switch rotatable members can be operated. As shown in FIGS. 4 and 5, the shaft 45 also may be provided with a capstan 69, which may be conveniently secured to the end of the shaft as by screw threaded engagement therewith for driving various parts of equipment which may be associated with the commutator and which may require a drive synchronized with the actuation of the commutator wafer switches.

In order to prevent re-engagement of the detent latch before the operator can turn the knurled knob 58, an off-center biasing mechanism is provided for automatically producing a relative angular displacement between the latching detent 63 and the socket 66 in the knob core 59 by turning the commutator shaft 45 a sufficient distance to prevent reengagement of the latching detent 63 until the operating knob has been advanced the full turn comprising its operating step. For this purpose, the rotation-limiting disc 57 on the shaft 45 is formed with a notch 70 in the face thereof adjacent to the mounting disc 50, and a ball 71 is positioned in a cylindrical guide 72 in the stationary mounting disc 50 so as to overlie the notch 70. In the OFF position of the commutator, as shown in FIG. 4, the ball 71 is poised on the forward or leading edge 70' of the notch 70 and a leaf spring 73 is arranged in engagement with the ball 71 so as to urge it into engagement with the adjacent surface of the rotation-limiting disc 57. The spring 73 may be mounted in any desired manner and is shown as being held in position by an upset rivet 74 extending through the spring 73 and fastening it to the mounting disc 50. A tongue 75 also is formed on the spring 73 and extends into a notch in the bearing 53. The spring 73 is further held against relative rotational displacement by a tongue 76 extending into a spring slot 77, and this tongue may be formed in any suitable manner, as being punched and bent up from the mounting disc 50 into engagement with the slot 77.

The construction and assembly of the parts of the latching detent 63 and the operating knob are so related to the shaft 45 and the commutator switch elements mounted thereon, and to the rotation-limiting disc 57 and its notch 70 and associated ball 71, that when the latching detent 63 is engaged in the knob socket 66, the ball 71 partially overlies the rotation-limiting disc notch 70 with the center of the ball 71 just past the forward or leading edge 70′ of the notch. Thus, when the latching detent 63 is released from its socket 66 by depression of the button 68, the spring 73 acting downwardly on the ball 71 will force it downwardly into the notch 70 which will produce a slight advance rotation of the rotation-limiting disc 57 and effect a corresponding slight angular advance of the shaft 45. This advance of the shaft 45 produces a corresponding angular advance displacement of the operating knob and, therefore, of the socket 66 in the knob core 59 to a position at which the latching detent 63 no longer registers with the knob core socket 66 thus unlatching the knob and its drive. This action results automatically whenever the knob is in latched position and the detent release button 68 is depressed.

When the latching detent 63 has thus been released, the operating knob may be rotated so as to advance the commutator through its predetermined single turn step of 360° in the illustrated construction. When this advance step has taken place, the latching detent 63 again will be biased upwardly into the operating knob core socket 66 by the compression spring 65, thereby latching the commutator against further movement. The one-way spring pawl clutch provided by the spring pawls 61 and the ratchet formed in the outer surface of the knob core 59 by the notches 60 prevents reverse rotation of the shaft 45 and assures a very simple, reliable, limited-rotation, unidirectional drive structure so as to provide the desired advance of the driven commutator member for each step of advance prior to actuation for a succeeding step and also assures against reverse rotation of all driven members mounted on the shaft 45.

A further embodiment of the present invention is illustrated in FIGS. 12–18, where an improved latching, limited-rotation, unidirectional drive is shown for a commutator 80 of a magnetic digital recorder having a main casing cover 81 and an inner mounting plate 82 secured to and spaced inwardly from the cover plate 81. The illustrated construction assures a minimum advance of a complete step or rotation of the commutator before another advance can be begun so as to provide for a reading of all of the connections connected to a plurality of commutator contacts 83 and a consequent recording thereof by a suitable recorder before a subsequent cycle can be begun. The details of the magnetic recorder do not form a part of the present invention and, therefore, are not illustrated and will not be described in this application. The illustrated commutator with its improved drive can be used with other types of equipment and the improved drive can also be used for other types of unidirectional, limited-rotation, cyclic driving needs.

The illustrated commutator 80 comprises three wafer switch units 84 of any suitable conventional type, with the stationary contacts 83 mounted on insulating rings 84′ and a rotatable contactor 83′ fixedly mounted on a central insulating disc 85 drivingly secured to a shaft 86. The three wafer switch units 84 are spaced apart by suitable insulating spacers 87 and spaced from a mounting plate 88 by other insulating spacers 87′, all of which are secured together by through bolts 89. The entire assembly is rigidly mounted by securing the mounting plate 88 to a supporting bearing member 90, which extends through the inner mounting plate 82 and is securely fastened thereto by having a shoulder 90′ drawn tightly against this plate by a suitable nut 91, which threadedly engages an end of the bearing member 90 and bears against the mounting plate 82.

The shaft 86 is rotatably supported by the bearing member 90 on the mounting plate 82 and is axially positioned thereon by a locking ring 92 engaged in a complementary groove in the shaft 86 and retained in position by the resilient biasing action of a step positioning device. This step positioning device comprises a disc 93 fixedly mounted on the shaft 86 for rotation therewith and closely spaced from the underside of the mounting plate 88. The outer edges of the disc 93 are formed with a plurality of undulations 94, which may be simply punch pressed in the disc, corresponding in number to the contacts 83 of each wafer switch unit, so that there is a valley 94′ of each undulation for each of these contacts 83. The mounting plate 88 is formed with a cylindrical guide 95 radially positioned over the undulations 94 of the disc 93, and may be made in any suitable manner, as by being pressed from the material of the plate to form a slight collar extending upwardly from the plate 88 away from the undulations 94. A resilient stepping arrangement is provided by positioning a suitable bal 96 within the guide 95, which ball has a diameter substantially equal to the internal diameter of the cylindrical guide 95, and resiliently biasing this ball 96 toward the undulations 94 by a suitable spring. This spring may comprise a leaf spring 97 arranged in engagement with the upper surface of the ball 96 and suitably secured to the mounting plate 88. In the illustrated structure, an upset boss 98 formed on the plate 88 secures the spring to the plate and a tongue 97′ on the spring extends into a small slot 99 in the bearing 90 further securing these together. In addition, a locating prong 100 may be punched from the plate 88 and extend upwardly through a complementary slot in the edge of the leaf spring 97, so as to locate the spring with reference to the plate 88 and to prevent it from turning around the shaft 86. In order to assure that the wafer switch rotatable contactor 83′ is at all times resiliently biased into engagement with one of the contacts 83, the disc 93 and the rotatable insulating disc 85 of the wafer switch unit are secured in relation to each other on the shaft 86 so that a valley 94′ of the undulations 94 is directly above the contactor 83′ of the rotatable switch unit insulating disc 85. Thus, whenever the shaft 86 is turned, the disc 93 turns with the shaft and carries the insulating disc 85 in such a manner that the spring 97 biases the ball 96 into a valley 94′ of the undulations on the disc and thereby biases the movable contactor 83′ into engagement with one of the stationary switch contacts 83.

Figure 17:
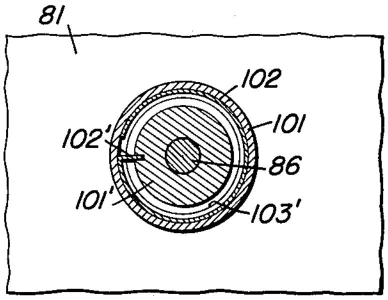
FIG. 17 is a sectional view, taken along line 17—17 of FIG. 12, illustrating the one-way clutch drive therein.

In order to assure the desired sequential engagement of successive stationary contacts 83 by the contactor 83′, the latter is adapted to be rotated by a unidirectional drive by manually turning a knurled driving knob member 101. The unidirectional rotation driving connection between the knurled knob 101 and the shaft 86 is provided by a one-way spring clutch comprising a resilient spring 102, which is mounted under slight compression within an internal groove 103 in the knurled knob 101 in frictional engagement with the clutching surface at the base of the groove 103, as shown in FIG. 17, with one end 102′ thereof securely fastened to a knob driven core member 101′. This knob core 101′ is fixedly secured to the shaft 86 in any suitable manner, as by a set screw 104 which extends through the core 101′ and engages an end of the shaft 86 which extends into a complementary socket 86′ in the core 101′. The one-way clutch spring 102 will permit the commutator 80 to be advanced only in a clockwise direction, as viewed in FIGS. 16 and 17, as an opposite rotation of the knob 101 will merely result in a tendency of the spring 102 to be compressed to a smaller diameter such that the knob 101 will simply slip around the clutch spring 102 and there will be no driving connection between the knob 101 and the knob core 101′.

Figures 12, 13, 14, 15:
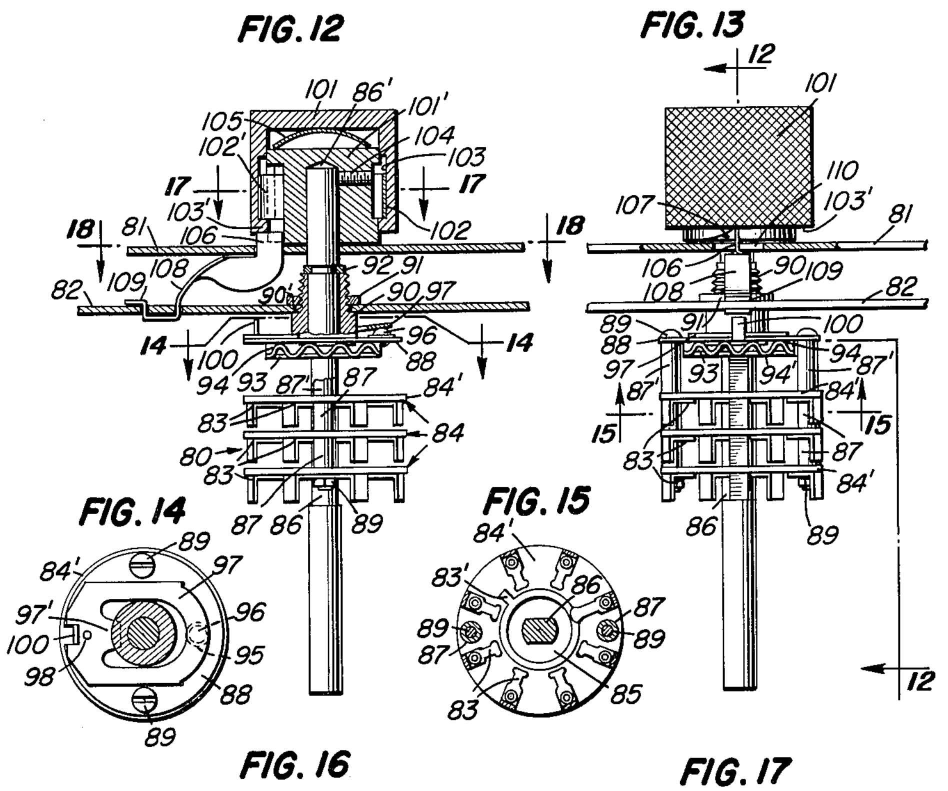
FIG. 12 is a side elevational view, partly broken away, illustrating a further embodiment of the present improved drive in a commutator adapted to be, used in a magnetic digital recorder or similar device, and taken along line 12—12 of FIG. 13.
FIG. 13 is a side elevational view, partly broken away, taken at right angles to the view shown in FIG. 12, viewed from the left-hand side of FIG. 12.
FIG. 14 is a view, taken along line 14—14 of FIG. 12, illustrating details of the stepping leaf spring structure.
FIG. 15 is a view, taken along line 15—15 of FIG. 13, illustrating details of a commutator wafer switch.
Figure 16:
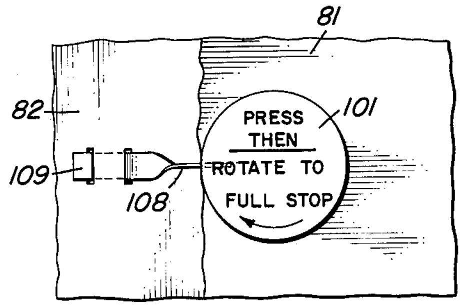
FIG. 16 is a fragmentary top plan view of the commutator drive shown in FIG. 12.

As is more clearly shown in FIG. 12, the knob 101 is formed as an axially movable shell which extends around the core 101′ in close sliding engagement therewith, and the spring groove 103 has an axial length which permits a predetermined amount of relative axial movement between the knob 101 and the core 101′, while the spring 102 has an axial width less than the groove 103 by a predetermined amount such that it will limit the relative movement between the knob 101 and the core 101′ to predetermined amounts in both axial directions. A suitable leaf spring 105 is arranged between the upper surface of the core 101′ and the inner surface of the knob 101 so as to provide an upward biasing force on the knob in relation to the core, while the lower edge of the knob 101 around the groove 103 has an inturned flange 103′ which is adapted to engage the lower surface of the clutch spring 102, thereby limiting the upward movement of the knob 101.

In order to provide a complete commutated entry or complete cycle of operation of the commutator 80, the rotatable contactor 83′ must be turned through a predetermined step, which in this instance is a full turn, for each reading or cycle, and each reading or cycle should begin from a fixed position. The knurled knob 101 functions as a driving member for operating the commutator and the shaft 86 functions as part of the driven member which transmits the step drive to the various commutating and other driven components with which the commutator is used.

In order to provide a starting point for each cycle and a stop indicative of the end of a cycle, a rotation limiting and latching means is provided which comprises a latch element 106 which is axially movable of the commutator and engageable in a socket 107 in the knob core 101′ for latching the core member 101′ against rotation. The latch element 106 may conveniently be formed, as best shown in FIG. 12, as an integral end portion of a two-direction leaf spring 108, which resiliently biases the latch element axially of the knob 101 and into latching engagement with the socket 107. This leaf spring 108 is secured in any suitable manner to the mounting plate 82, as by threading the end 109 thereof, opposite the latch element 106, through a pair of slots in the mounting plate 82.

Figure 18:
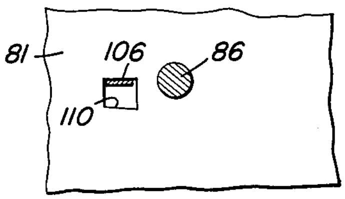
FIG. 18 is a sectional view, taken along line 18—18 of FIG. 12, illustrating details of the latching element extending through a slot in the casing of a recorder or similar device.

In order to operate the commutator, the knob 101 is depressed so that the flange 103′ on the lower end thereof, acting as a release element, presses the latch element 106 out of the socket 107. As shown in FIGS. 13 and 18, the cover plate 81 is formed with a slot 110 through which the latch element 106 extends, and depression of this element by the knob flange 103′ to a position where the end of the element 106 is below the lower surface of the core 101′ results in a slight relative reverse angular displacement between the latch element 106 and the knob core socket 107 by the two-way spring 108 in a direction opposite to the driving direction of the core 101′ by the knob 101 through the one-way clutch spring 102. This provides for automatically producing a relative angular displacement between the latching element 106 and the socket 107 in the knob core 101′ a distance sufficient to prevent reengagement of the latching means until the operating knob 101 has been advanced the full turn which comprises its operating step. In this manner, the latching means is released from its latched position and will remain unlatched until the knob 101 has been advanced one full turn, whereupon the latching element 106 again latches the core member against rotation by engagement with the core socket 107. This reengagement of the latch element 106 in the socket 107 is smoothly brought about by tapering the upper surface of the leading side of the notch 107 from the lower surface of the core 101′ so as to provide a gradual lead-in incline to the socket 107. When the trailing edge of the socket 107 engages the latch element 106, the detent ball 96 will be biased by the spring 97 into a valley 94′ of the undulations 94 so as to turn the shaft 86, and thereby the core 101′, to a rest position which shifts the core 101′, and with it the latch element 106, angularly from the initial engagement positions thereof, against the biasing force of the two-way leaf spring 108, and returns the latch element 106 to the position shown in FIG. 13. This latches the entire drive and prevents the start of a new cycle of operation of the commutator 80 until the operating knob 101 is again depressed so as to again release the latch element 106 from the socket 107 in the core 101′. In this manner, the unidirectional drive assures a one-turn, single step operation through the improved drive which requires a positive unlatching of the rotation limiting and latching means before the start of each new cycle of operation. Also, the unidirectional spring clutch drive of the spring 102 between the operating knob 101 and its core 101′ assures against reengagement of the latching means before an operating step has been completed, as it is impossible to actuate the commutator in a reverse direction from that in which it is intended that it should be driven. In this manner, a very simple, reliable, limited rotation, unidirectional drive structure is provided which assures a predetermined advance of a driven member for each operating step prior to actuation for a succeeding step and also assures against reverse rotation of the driven member.

While particular embodiments of this invention have been illustrated and described, modifications thereof will occur to those skilled in the art. It is to be understood, therefore, that this invention is not to be limited to the particular details disclosed, and it is intended in the appended claims to cover all modifications within the spirit and scope of this invention.

What is claimed is:

1. A latching one-turn unidirectional drive including a shaft and an operating knob comprising a driven core member connected to said shaft and a driving sleeve member mounted around said core member in rotatably slidable relation thereto, a unidirectional drive means for connecting together said knob members for one-direction drive only, means including a latch element engageable with said core member for limiting rotation and for latching said core member, means for releasing said latch element, and means operable in response to release of said latch element for placing said latch element in nonlatching position whereby said latching means remains unlatched until said knob has been advanced substantially one turn whereupon said latch element reengages said core member and again latches said core member against rotation.

2. A one-turn unidirectional drive including a shaft and an operating means comprising a driven member connected to said shaft and a driving member rotatably mounted relative to said driven member, a unidirectional drive means for connecting together said operating means members, means including a latch element engageable with said driven member for latching said operating means, means for releasing said latch element, and means operable in response to release of said latch element for moving said latch element opposite to the direction of said unidirectional drive and into nonlatching position whereby said latching means remains unlatched until said operating means has been advanced substantially one turn whereupon said latch element reengages said driven member and again latches said operating means against rotation.

3. A latching one-turn unidirectional drive including a shaft and an operating means comprising a driven core member connected to said shaft and a driving sleeve member mounted around said core member, means for providing a unidirectional drive between said sleeve and core members, means resiliently biasing said operating means members axially relative to one another, means for locating the relative axial positions of said operating means members and limiting the relative axial movement thereof, rotation latching means comprising a latch element and a socket in said core member engageable by said latch element for latching said core member against rotation, means including a two-direction leaf spring connected to said latch element for resiliently biasing said latch element axially of said core member and into latching engagement therewith in said core socket, means including said sleeve member operable axially of said core member for engaging and moving said latch element from latched engagement with said core socket, said resilient biasing means two-direction leaf spring being constructed and arranged also to exert a biasing force on said latch element on movement thereof out of engagement with said core socket for providing a slight relative angular displacement thereof in a direction relative to said core socket opposite to said one driving direction so that said latch element remains unlatched from said core socket until said operating means has been advanced substantially one turn whereupon said latch element again latches said core member against rotation through engagement with said core socket.

4. A latching limited-rotation unidirectional drive including a shaft and an operating knob comprising a driven core member connected to said shaft and a driving sleeve member mounted around said core member in rotatably slidable relation thereto, means including a flange and an oppositely faced shoulder respectively on ends of said two knob members for locating the relative axial positions thereof, a unidirectional drive means comprising a spring clutch having a clutching surface in one of said knob members and a spring pawl mounted on the other of said knob members and drivingly engageable with said clutching surface on rotation of said sleeve member in one direction and loosely slidable relative to said one member on rotation of said sleeve member in the opposite direction, means for limiting rotation and for latching said operating knob drive comprising a latch element and a socket in said knob core member engageable by said latch element for latching said knob core member against rotation, means for resiliently biasing said latch element axially of said knob and into said socket, means operable axially of said knob for releasing said latch element from said socket and unlatching said operating knob drive, and means responsive to unlatching of said operating knob drive for exerting a biasing force providing for a slight relative angular displacement between said knob core socket and said latch element whereby to locate said core socket in said one driving direction relative to said latch element so that said latching means thereafter remains unlatched until said knob has been advanced the predetermined limited rotation whereupon said latching means again latches said knob core member against rotation through engagement of said latch element in said core socket.

5. A latching one-turn unidirectional drive including a shaft and an operating knob comprising a driven core member connected to said shaft and a driving sleeve member mounted around said core member in rotatably and axially slidable relation thereto, means connecting together said knob members for driving rotation in one direction only, means including an undulated disc secured to said shaft and a detent ball adapted to engage undulations in said disc for defining multiple rest positions of said shaft, means resiliently biasing said detent ball into engagement with said disc whereby said disc is biased to turn angularly to bring a valley of said disc undulations in alignment under said detent ball as a rest position, rotation limiting and latching means comprising a latch element and a socket in said knob core member engageable by said latch element for latching said knob core member against rotation, means including a two-direction leaf spring connected to said latch element for resiliently biasing said latch element axially of said knob and into latching engagement in said socket prior to alignment of said detent ball with a valley of said disc, said rest position defining means being arranged to shift said latch element and knob core member angularly from the initial engagement positions thereof against a biasing force of said leaf spring to a rest position of said detent ball and disc, means for engaging said latch element and releasing it from said core socket whereby said leaf spring exerts a biasing force on said latch element providing a slight relative reverse angular displacement between said latch element and said knob core socket in a direction opposite to said one driving direction relative to said core socket so that said latching means remains unlatched until said knob has been advanced one turn whereupon said latching means again latches said knob core member against rotation by engagement of said latch element in said core socket.

6. A latching one-turn unidirectional drive including a shaft and an operating knob comprising a driven core member connected to said shaft and a driving sleeve member mounted around said core member in rotatably and axially slidable relation thereto, a unidirectional drive means comprising a slip clutch spring member mounted on one of said knob members and drivingly engageable with the other of said knob members on rotation of said sleeve member in one direction and loosely slidable relative to said one member on rotation of said sleeve member in the other direction, means resiliently biasing said knob members axially relative to one another, means including a flange and an oppositely faced shoulder respectively on ends of said knob sleeve and core members arranged on opposite sides of said slip clutch spring member for locating the relative axial positions of said knob members and limiting the relative axial movement thereof by said resilient axial biasing means, rotation limiting and latching means comprising a latch element and a socket in said knob core member engageable by said latch element for latching said knob core member against rotation, means including a two-direction leaf spring connected to said latch element for resiliently biasing said latch element axially of said knob and into latching engagement in said core socket, means including said flange on said knob sleeve member operable axially of said knob core member for engaging and releasing said latch element from said core socket, said resilient biasing means two-direction leaf spring being constructed and arranged also to exert a biasing force for providing a slight relative angular displacement between said knob core socket and said latch element upon release of said latch element whereby said latch element is displaced in a direction relative to said core socket opposite to said one driving direction so that said latch element remains unlatched from said core socket until said knob has been advanced substantially one turn whereupon said latch element again latches said knob core member against rotation through engagement in said core socket.

7. A one-turn unidirectional drive including a shaft and an operating means comprising a driven member connected to said shaft and a driving member rotatably mounted relative to said driven member, a unidirectional drive means for operably connecting said driving and driven members, means for latching said driven member, means for releasing said latching means, means operable in response to release of said latching means providing for maintaining said driven member unlatched until said driven member has been advanced one full turn whereupon said latching means again latches said driven member against rotation.

8. A one-turn unidirectional drive including a shaft and an operating knob comprising a driven member connected to said shaft and a driving member mounted in rotatably slidable relation around said driven member, a unidirectional drive means for connecting together said knob members for one-direction drive only, means including a latch element engageable with said knob driven member for latching said unidirectional drive means against rotation on completion of each full turn, means for releasing said latch element, means operable in response to release of said latch element for providing a relative angular displacement between said latch element and said knob driven member whereby said latching means remains unlatched until said knob has been advanced one turn whereupon said latch element reengages said knob driven member and again latches said unidirectional drive means against rotation.

9. A latching limited-rotation unidirectional drive including a shaft and an operating knob comprising a driven core member connected to said shaft and a driving sleeve member mounted around said core member in rotatably slidable relation thereto, a unidirectional drive means for connecting together said knob members for one-direction drive only, means for limiting rotation and for latching said driven core member, means for releasing said latching means, and means operable in response to release of said latching means for placing said latching means in non-latching position whereby said latching means remains unlatched until said knob has been advanced the predetermined limited rotation when said latching means again latches said driven core member against rotation.

10. A one-turn indirectional drive including a shaft and an operating knob comprising a driven member connected to said shaft and a driving member rotatably mounted relative to said driven member, a unidirectional drive means for connecting together said operating knob members, means for latching said unidirectional drive means comprising a latch element and a socket in said knob driven member engageable by said latch element for latching said driven member against rotation, means for releasing said latch element, and means including a detent receiving element secured to said shaft and a detent held in engagement with an edge of said receiving element in the latched position of said drive with means resiliently biasing said detent toward said receiving element exerting a biasing force on said receiving element for providing a slight relative angular displacement between said knob driven member socket and said latch element upon release of said latch element whereby said latching means remains unlatched until said knob has been advanced one full turn whereupon said latching means again latches said knob driven member against rotation through engagement of said latch element in said socket.

11. A latching limited-rotation unidirectional drive including a shaft and an operating knob comprising a driven core member connected to said shaft and a driving sleeve member mounted around said core member in rotatably slidable relation thereto, a unidirectional drive means connecting together said knob members, means for limiting rotation and for latching said unidirectional drive means comprising a latch element and a socket in said knob core member engageable by said latch element for latching said knob core member against rotation, means for resiliently biasing said latch element axially of said knob and into said socket, means operable axially of said knob for releasing said latch element from said socket and unlatching said undirectional drive means, and resilient means constructed and arranged to exert a biasing force for providing a slight relative angular displacement between said knob core socket and said latch element upon release of said latch element whereby said latching means remains unlatched until said knob has been advanced the predetermined limited rotation when said latching means again latches said knob core by engagement of said latch element in said core socket.

12. A one-turn unidirectional drive including a shaft and an operating knob comprising a driven member connected to said shaft and a driving member rotatably mounted relative to said driven member, a unidirectional drive means for connecting together said operating knob members, means for latching said unidirectional drive means comprising a latch element and a socket in said knob driven member engageable by said latch element for latching said driven member against rotation, means for releasing said latch element, and means including an off-center biasing mechanism comprising a ball receiving element secured to said shaft and a ball held off-center over and in engagement with an edge of said receiving element in the latched position of said drive with means resiliently biasing said ball toward said receiving element exerting a biasing force on said receiving element for providing a slight relative angular displacement between said knob driven member socket and said latch element upon release of said latch element whereby said driven member socket is located in said one driving direction relative to said latch element so that said latching means remains unlatched until said knob has been advanced one full turn whereupon said latching means again latches said knob driven member against rotation through engagement of said latch element in said socket.

13. A limited-rotation unidirectional drive including a shaft and an operating knob comprising a driven member connected to said shaft and a driving member rotatably mounted around said driven member, a unidirectional drive means comprising a ratchet notch in one of said knob members and a spring pawl mounted on the other of said knob members and drivingly engageable in said notch on rotation of said driving member in one direction and loosely slidable relative to said one member on rotation of said driving member in the opposite direction, means for limiting rotation and for latching said unidirectional drive means comprising a latch element and a socket in said knob driven member engageable by said latch element for latching said driven member against rotation, means for resiliently biasing said latch element axially of said knob and into said socket, means including a push button operable axially of said knob for releasing said latch element from said socket and unlatching said unidirectional drive means, means including an off-center biasing mechanism comprising a ball receiving element secured to said shaft and a ball held off-center over and in engagement with an edge of said receiving element in the latched position of said drive, means resiliently biasing said ball toward said receiving element exerting a biasing force on said receiving element for providing a slight relative angular displacement between said knob driven member socket and said latch element upon release of said latch element whereby said driven member socket becomes located in said one driving direction relative to said latch element so that said latching means remains unlatched until said knob has been advanced the predetermined limited rotation whereupon said latching means again latches said knob driven member against rotation through engagement of said latch element in said socket.

References Cited by the Examiner

UNITED STATES PATENTS

| | | | |
|---|---|---|---|
| 2,214,730 | 9/1940 | Jeffers | 74—527 |
| 2,857,782 | 10/1958 | Glueckstein et al. | 74—527 |
| 2,973,667 | 3/1961 | Williams | 74—565 |

BROUGHTON G. DURHAM, *Primary Examiner.*